United States Patent Office 3,454,163
Patented July 8, 1969

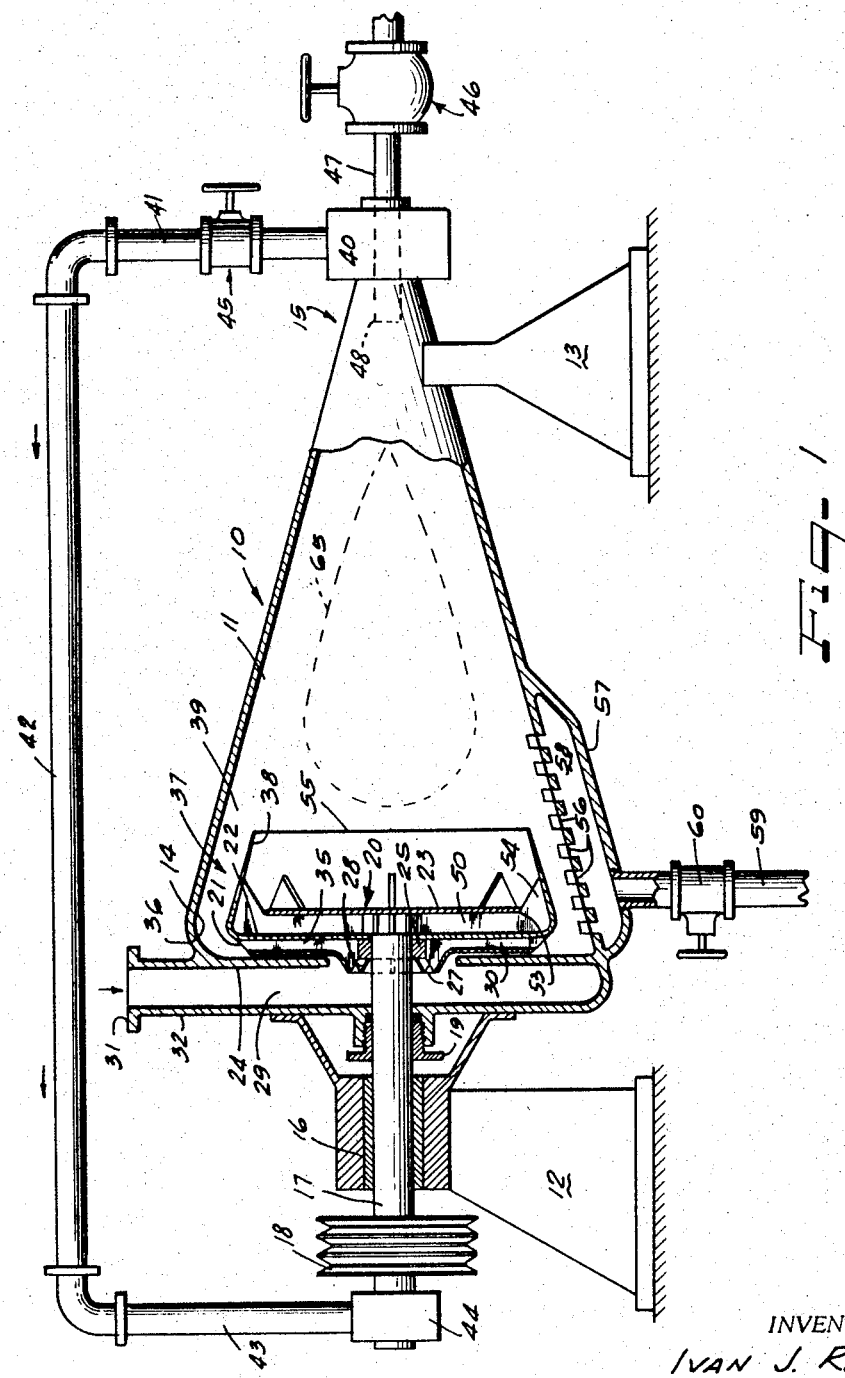

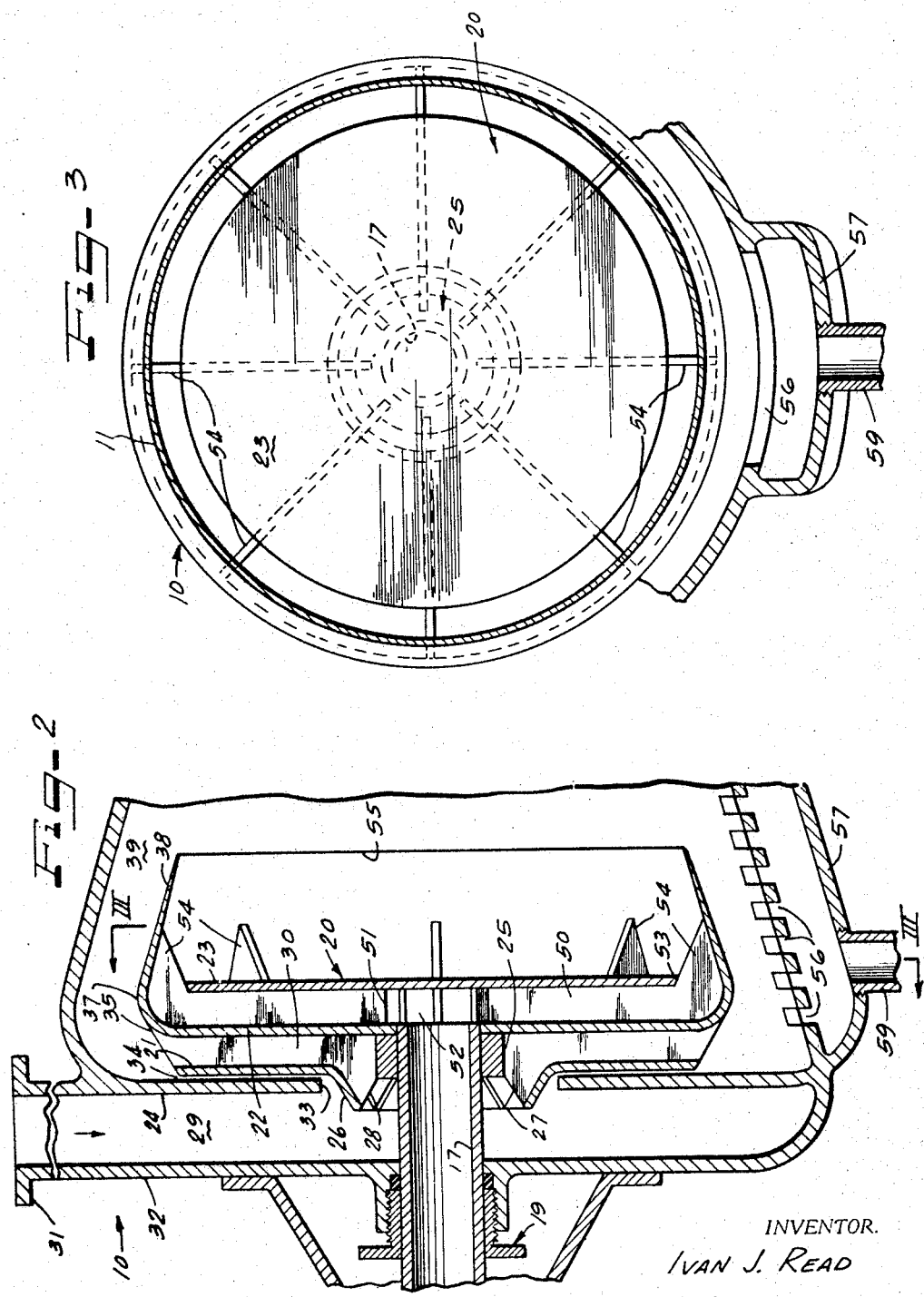

3,454,163
METHOD OF SEPARATING SOLIDS FROM LIQUIDS
Ivan Jay Read, R.R. 2, Plymouth, Ind. 46563
Original application Apr. 14, 1967, Ser. No. 630,992, now Patent No. 3,399,773, dated Sept. 3, 1968. Divided and this application Apr. 8, 1968, Ser. No. 736,874
Int. Cl. B01d 21/26
U.S. Cl. 210—78       5 Claims

ABSTRACT OF THE DISCLOSURE

Method for separating solids from liquids, specifically "foots" from liquefied unrefined animal fats, in which the flowable feed material is introduced at the larger end of a stationary, conical shell into a driven impeller that imparts an outward swirling movement to the feed material to cause it to hug the inner surface of the shell in its flow to the small end thereof.

Separately controlled amounts of the material reaching the small end are respectively discharged and recirculated, the recirculated material being introduced into a shrouded impeller for imparting thereto a swirling forward flow deflected generally inwardly of the feed material flow. Slots are provided in and along the lower portion of the shell adjacent its larger end for passage therethrough of solids that are thrown outwardly from the feed material or settle therefrom.

---

This application is a division of my prior copending application Ser. No. 630,992 filed Apr. 14, 1967, and now U.S. Patent 3,399,773 issued Sept. 3, 1968.

*Summary of the invention*

This invention relates to a method of separating solids from liquids containing them. More particularly the invention is useful in separating foreign or contaminating solids, termed "foots," from liquefied raw fats and fatty materials containing such solids.

The apparatus comprises a stationary, conical shell, mounted with its axis horizontal, having a multi-section impeller at its larger end and valve controlled discharge connections at its smaller end, one arranged axially and slightly inwardly for the removal of relatively solids-free liquid material, and one arranged radially for recirculation of liquid material back to an impeller section through a driven hollow shaft on which the impeller is carried.

The multi-section impeller includes a series of spaced plates extending radially and impeller vanes between successive plates for imparting an outwardly swirling movement to the impelled material. The feed material is acted upon by an impeller section nearest the larger end of the shell, while the recirculated material is acted upon by an axially inner impeller section provided with a circumferential shroud conforming to and spaced from the shell to afford a radially outer flow of the feed material and a radially inward flow of recirculated material in the direction of the smaller end of the shell.

Slots or apertures are provided in the lower shell wall below the multi-section impeller to permit the removal of solids therethrough into a collecting chamber, from which they may be withdrawn through a valved discharge line by gravity.

*Description of the drawings*

FIG. 1 is a side elevational view, partly broken away and in section, of apparatus embodying the principles of my invention;

FIG. 2 is an enlarged, fragmentary, vertical sectional view of a larger end of the apparatus; and FIG. 3 is a sectional view taken substantially along the broken line III—III of FIG. 2.

As shown on the drawings:

The reference numeral 10 indicates generally apparatus embodying the principles of my invention, comprising a conically-shaped shell 11, suitably formed of metal and stationarily mounted with its axis horizontal on supports 12 and 13 adjacent the larger end 14 and smaller end 15 of the shell, respectively. The support 12 carries a bearing mounting 16 through which a hollow driven shaft 17 extends. Said shaft 17 is driven at its outer end through a pulley, or sheath 18, by means of belts (not shown). The other end of the shaft 17 passes through a packing gland 19 into the larger end 14 of the shell 11 and carries at its inner end a multi-section impeller, designated generally by the reference numeral 20.

Said multi-section impeller 20 comprises a plurality of plates 21, 22 and 23 arranged in spaced, radially extending planes. The plate 21, which is nearest to the end wall 24 that substantially closes the larger end 14 of the shell, is carried by a collar 25 fixedly mounted upon the hollow shaft 17. As best shown in FIG. 2, the plate 21 is provided with an outwardly and radially inwardly offset annular portion 26 that is connected through a hollow hub 27 to said collar 25. The hub 27 is provided with vanes 28 that serve to direct the flow of liquid material introduced into an outer chamber 29, into an annular vaned space 30 between the plates 21 and 22. Chamber 29 serves as the receiving chamber for the liquid feed material that is introduced thereinto through a flanged connection 31. An outer wall 32 and the wall 24, both of which may be integral with the shell 11, define a fully annular portion of the space 29 which is filled during operation with the raw food material.

In order to accommodate the offset portion 26 of the plate 21, the radially inward end of the wall 24 terminates as at 33. Clearance 34 is provided between the relatively moving opposed surfaces of the stationary wall 24 and the rotating plate 21. Both the plates 21 and 22 are imperforate, so that feed material introduced through the vaned hub 27 into the space 30 is picked up by the radial vanes 35 extending between such plates and secured thereto, and is thrown radially outwardly by said vanes toward the arcuate inner surface 36 at the larger end 14 of the shell. Said arcuate surface 36 smoothly converts the radially outward flow of feed material into flow along the inner tapering surface of the conical shell 11.

The radially extending intermediate plate 22 is provided with a circumferentially extending shroud 37 having a fully annular inwardly projecting portion 38 conforming in taper to that of the shell 11 and spaced therefrom to provide a short passageway 39. The flow of material from the vanes 35 is thus caused by its confinement within the passageway 39 to continue to hug the inner surface of said shell 11 in its passage toward the smaller end 15 of said shell.

From the smaller end 15, some of the liquid material passes into a receiving chamber 40, from which it passes into a radially upwardly extending piping 41, along a horizontally extending length of piping 42, downwardly through a vertical length of piping 43 and thence into a chamber formed by a rotary joint housing 44 having flow communication with the interior of the hollow driven shaft 17. A valve 45 in the section of piping 41 controls the flow therethrough of the recirculated liquid material. Additionally, a valve 46 in an axially extending length of discharge pipe 47 controls the back pressure built up at the inner end 48 of said pipe 47, and hence serves to control the amount of feed material by-passed from the chamber 40 into the piping 41. Said inner end 48 of the piping 47 terminates sufficiently inwardly of the chamber 40 to insure that the liquid feed entering the open inner end 48 is relatively free from settleable solids. In fact, the valves 46 and 45 are so controlled, in combination with the control of the speed of revolution of the multi-vane impeller 20, that the liquid material discharged through the valve 46 is relatively free from solids and can be used as such, or run through screens if further refinement is desired.

The innermost plate of the multi-vane impeller 20 cooperates with the intermediate plate 22 to house radially extending vanes 50, which terminate, as at 51, radially outwardly of the inner open end 52 of the hollow shaft 17, and which extend radially outwardly beyond the periphery 53 of said plate 23. The peripheral extensions of the vanes 50, indicated by the reference numeral 54, are circumferentially confined by the shroud 37 but terminate short of the constricted throat 55 of said shroud. Said vane terminal portions 54 impell the recirculated liquid material along a path that is initially guided by the radially inwardly tapered wall of the throat 55, with the result that the liquid material thrown out through the throat 55 tends to flow along with but radially inwardly of the path followed by the raw feed material after leaving the annular passage 39. Thus, the raw feed material which, as previously stated, tends to hug the inner surface of the shell 11, forms a fluid barrier tending to prevent the recirculated flowable material from reaching the inner surface of said shell 11. Any settleable solids carried by the recirculated liquid material, however, as well as settleable solids in the raw feed material, are free to be thrown outwardly and to settle against the inner shell surface, particularly against the lower portion of said surface.

To take advantage of this tendency of the settleable solids to separate out from the main paths of flow of the liquid material through the shell 11, there are provided a plurality of slots 56 in the lower portion of the shell 11 adjacent the larger end thereof, as best shown in FIG. 2. Such slots 56 have a circumferential extent of perhaps a few inches or less, and are generally of a width of between ⅛ inch and ¾ of an inch. In general, the series of slots 56 extend toward the smaller end of the shell for only a short distance, somewhat beyond the plane of the throat 55, as in FIG. 2. An outwardly spaced wall 57 serves to enclose the area of the slots 56 and to provide a collection chamber 58 for solids passing through such slots into said chamber. A gravity drain pipe 59, controlled by a valve 60, serves to empty the chamber 58, either continuously or at periodic intervals.

*Operation*

In the operation of the above described apparatus, using animal fat as the feed material, the composition of the feed material introduced into the flange connection 31 runs from 10 to 25% solids by weight in the liquefied fat. As a result of prescreening, the particle size of the solids would be from about ¼ inch by ¼ inch maximum dimensions down to submicron dimensions. The temperature of the feed is maintained at about 180 to 190° F., or at such temperature as to keep the feed material of a sufficiently low viscosity to facilitate the separation therefrom of the solids.

The shaft 17 and attached multi-section impeller 20 is driven at a speed of around 3600 r.p.m. The raw feed material entering through the flange connection 31 and through the vaned hub 27 to the nearest section of the impeller that includes the blades 35, is thrown outwardly against the arcuate portion 36 of the shell and travels forwardly through the passageway 39. Sufficient centrifugal force is imparted to the feed material to cause it to hug the inner surface of the shell 11 as it flows toward the smaller end 15 of the shell.

Due to the centrifugal action imparted by the impeller blades 35, the solids content of the feed material tend to be thrown outwardly and downwardly through the slot openings 56 into the solids collector chamber 58. Solids and liquid are withdrawn from the chamber 58 through the valve 60 and pipe 59 to waste, either continuously or periodically.

As a result of the withdrawal of such solids, the feed material reaching the smaller end 15 contains a lower solids content than the raw feed material. From the smaller end, the flowable material passes into the chamber 40 and a desired proportion thereof is recycled through the valve 45, piping 41–42–43, back through the chamber 44 and the hollow shaft 17 to the multi-vaned impeller 20. From the inner end of the hollow shaft 17, the recycled flowable material passes into the section of the impeller that includes the blades 50 and is thrown outwardly and forwardly by said blades and their peripheral extensions 54. Such flow of the impelled material is confined circumferentially by the shroud 38 and caused to flow through the constricted throat 55 along a conical path radially inwardly of but in contact with the raw material flowing along the inner tapered wall of the shell 11. This arrangement provides for a minimum of turbulence between the two layers of flowable material within the shell 11, so as to prevent any such excessive mixing between the recirculated and feed material as would lessen the advantage of the recycling. The shell 11 is maintained around theree-quarters full of flowable liquid material, but not so full as to interfere with the material, assuming a normal curvature of flow about a naturally formed vortex. Such a vortex is indicated by the dotted lines 65 in FIG. 1.

The extent of recycling will depend upon the degree of clarification required. It would ordinarily be considered satisfactory if, as a result of the operation of my apparatus, a clarified fat containing not more than 2% by weight of solids is obtained. These solids would be of an extremely fine nature, but capable of removal in a subsequent polishing operation.

The axial removal of the more or less clarified material through the open end 48 of the discharge pipe 47 aids in lessening the percentage of solids carried by the discharged liquid material, since much of the solids content is thrown outwardly and is either drawn off through the discharge piping 59 or is carried into the chamber 40 for recirculation. By proper control of the valves 46 and 45 a proper back pressure can be impressed upon the flow of material toward the smaller end of the shell and thus facilitate the removal of the solids content to the desired extent before ultimate discharge of the flowable liquid material through the discharge pipe 47 and valve 46 to a reservoir (not shown) for collection thereof.

The advantages of my apparatus are that it requires fewer moving parts than the usual type of centrifugal separator; it provides for continuous or periodic recycling of the flowable material; it is simple in design and operation; it entails considerably less wear than scroll type machines; and constitutes a self-contained unit as contrasted to hydroclones and pumps.

It will be understood that modifications and variations may be effected without departing from the scope of the novel concepts of the present invention.

I claim:
1. The method of separating solids from liquids containing said solids, which comprises
   effecting a forced flow of raw material of a solids-containing liquid through a confined axially horizontal conical flow path tapering from a larger toward a smaller end in the direction of flow,
   effecting a second forced flow of flowable material returned from said smaller end also along but radially inwardly of said confined conical flow path, and
   withdrawing solids from the lower portion of said first mentioned conical flow path adjacent said larger end thereof.

2. The method as defined by claim 1, wherein said solids-containing liquid is a liquefied fatty material containing solids carried therein.

3. The method as defined by claim 2, wherein the forced flow of said raw flowable material is effected by centrifugal action that creates a swirling outward movement of such flowable material confined to said conical flow path and the forced flow of returned material has imparted thereto an initially confined flow path toward said smaller end tending to cause said returned material flow path to be radially inwardly of said first mentioned flow path but in fluid communication along the length thereof.

4. The method as defined by claim 2, wherein said forced flows are effected by centrifugal forces, and withdrawal of said solids from said raw flowable material is partly the result of such centrifugal forces as are applied thereto and partly the result of gravity acting upon said solids.

5. The method as defined by claim 1, wherein said second flow of flowable material has a take-off point axially inwardly of said smaller end, and is reintroduced axially of said larger end.

References Cited

UNITED STATES PATENTS

| | | | |
|---|---|---|---|
| 3,064,811 | 11/1962 | Mumper | 55—261 X |
| 3,235,090 | 2/1966 | Bose et al. | 210—512 |
| 3,235,091 | 2/1966 | Doll et al. | 210—512 |
| 3,259,246 | 7/1966 | Stavenger | 210—512 X |
| 3,399,773 | 9/1968 | Read | 210—512 X |

FOREIGN PATENTS

| | | |
|---|---|---|
| 161,970 | 3/1955 | Australia. |
| 517,543 | 2/1931 | Germany. |

REUBEN FRIEDMAN, *Primary Examiner.*

J. L. DE CESARE, *Assistant Examiner.*

U.S. Cl. X.R.

209—211; 210—84, 196, 512